(12) United States Patent
Onozaki et al.

(10) Patent No.: US 8,903,157 B2
(45) Date of Patent: Dec. 2, 2014

(54) FUSION SPLICER AND METHOD FOR DETERMINING AN OPTICAL FIBER TYPE

(71) Applicant: Fujikura Ltd., Tokyo (JP)

(72) Inventors: Shu Onozaki, Sakura (JP); Noriyuki Kawanishi, Sakura (JP); Tomohiro Konuma, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 14/047,522

(22) Filed: Oct. 7, 2013

(65) Prior Publication Data

US 2014/0044339 A1 Feb. 13, 2014

Related U.S. Application Data

(63) Continuation of application No. PCT/JP2012/064982, filed on Jun. 12, 2012.

(30) Foreign Application Priority Data

Sep. 2, 2011 (JP) .................................. 2011-191908

(51) Int. Cl.
*G06K 9/00* (2006.01)
*G02B 6/255* (2006.01)
*G06T 7/00* (2006.01)

(52) U.S. Cl.
CPC ............ *G02B 6/2553* (2013.01); *G02B 6/2551* (2013.01); *G06T 7/001* (2013.01); *G02B 6/2555* (2013.01)
USPC ........................................... 382/145; 385/96

(58) Field of Classification Search
None
See application file for complete search history.

(56) References Cited

U.S. PATENT DOCUMENTS

| 5,611,015 | A | * | 3/1997 | Tokumaru et al. | ............... 385/98 |
| 5,758,000 | A | | 5/1998 | Zheng | |
| 2002/0159724 | A1 | * | 10/2002 | Oki et al. | ......................... 385/97 |
| 2002/0197027 | A1 | * | 12/2002 | Saito et al. | ...................... 385/96 |

(Continued)

FOREIGN PATENT DOCUMENTS

| JP | 09-179003 A | 7/1997 |
| JP | 2002-169050 A | 6/2002 |

(Continued)

OTHER PUBLICATIONS

Japanese Office Action of Japanese Application No. 2011-191908 dated Feb. 5, 2013.

(Continued)

*Primary Examiner* — Hadi Akhavannik
(74) *Attorney, Agent, or Firm* — Sughrue Mion, PLLC (57) ABSTRACT

A fusion splicer includes an imaging unit configured to take a lateral transmission image by illuminating a target optical fiber from a lateral direction of the target optical fiber; a determination module configured to create a target luminance distribution in a direction perpendicular to an optical axis of the target optical fiber using the lateral transmission image so as to determine a type of the target optical fiber, by comparing the target luminance distribution with preliminarily registered data of a reference luminance distribution of a reference optical fiber; and a registration module configured to create a message when the target luminance distribution is determined to be outside a tolerance of the reference luminance distribution and to display the message to an operator so that the operator can decide whether or not to register the target luminance distribution of the target optical fiber as a new reference luminance distribution.

15 Claims, 5 Drawing Sheets

(56) References Cited

U.S. PATENT DOCUMENTS

| | | |
|---|---|---|
| 2003/0021554 A1* | 1/2003 | Suzuki ............... 385/96 |
| 2003/0088534 A1 | 5/2003 | Kalantar et al. |
| 2004/0047572 A1* | 3/2004 | Hattori ............... 385/96 |
| 2005/0265655 A1* | 12/2005 | Okazaki et al. ........ 385/31 |
| 2006/0074516 A1 | 4/2006 | Huang |
| 2006/0171643 A1* | 8/2006 | Hattori ............... 385/96 |
| 2009/0232364 A1 | 9/2009 | Hosoi |

FOREIGN PATENT DOCUMENTS

| | | |
|---|---|---|
| JP | 2004-341452 A | 12/2004 |
| JP | 2005-509220 A | 4/2005 |
| JP | 2006-005817 A | 1/2006 |
| JP | 2006-509220 A | 3/2006 |
| JP | 2009-223580 A | 10/2009 |
| JP | 4367597 B2 | 11/2009 |
| WO | 03/041003 A1 | 5/2003 |
| WO | 03/096088 A1 | 11/2003 |

OTHER PUBLICATIONS

International Search Report of PCT/JP2012/064982 dated Jul. 17, 2012.

\* cited by examiner

| TARGET OPTICAL FIBER | DETERMINATION RESULT BY EXAMPLE | | | | | | TOTAL |
| --- | --- | --- | --- | --- | --- | --- | --- |
| | SM1 | SM2 | MM | NZ1 | NZ2 | NZ3 | |
| SM1 | 94 | 4 | 0 | 1 | 1 | 0 | 100 |
| SM2 | 2 | 96 | 0 | 0 | 2 | 0 | 100 |
| MM | 0 | 0 | 100 | 0 | 0 | 0 | 100 |
| NZ1 | 1 | 2 | 0 | 93 | 3 | 1 | 100 |
| NZ2 | 0 | 2 | 0 | 4 | 91 | 3 | 100 |
| NZ3 | 1 | 1 | 0 | 5 | 1 | 92 | 100 |

FIG. 7

| TARGET OPTICAL FIBER | DETERMINATION RESULT BY COMPARATIVE EXAMPLE | | | | | | TOTAL |
| --- | --- | --- | --- | --- | --- | --- | --- |
| | SM1 | SM2 | MM | NZ1 | NZ2 | NZ3 | |
| SM1 | 70 | 19 | 1 | 3 | 5 | 2 | 100 |
| SM2 | 15 | 69 | 2 | 3 | 7 | 4 | 100 |
| MM | 3 | 1 | 71 | 21 | 2 | 2 | 100 |
| NZ1 | 4 | 6 | 1 | 55 | 22 | 12 | 100 |
| NZ2 | 8 | 11 | 0 | 18 | 52 | 11 | 100 |
| NZ3 | 6 | 8 | 1 | 25 | 11 | 49 | 100 |

FIG. 8

FUSION SPLICER AND METHOD FOR DETERMINING AN OPTICAL FIBER TYPE

CROSS REFERENCE TO RELATED APPLICATIONS

This application is a continuation application of PCT application No. PCT/JP2012/064982 filed on Jun. 12, 2012 and claims the benefit of priority from JP 2011-191908 filed on Sep. 2, 2011; the entire contents of which are incorporated by reference herein.

BACKGROUND OF THE INVENTION

1. Field of the Invention

The present invention relates to a fusion splicer and a method for determining an optical fiber type.

2. Description of Related Art

Electric discharge heating conditions for fusion splicing of optical fibers are different depending on the type of the optical fiber. The optimal electric discharge heating conditions for different optical fibers are preliminarily registered in a memory of a fusion splicer. When carrying out fusion splicing work, if the type of the optical fiber prepared for fusion splicing is known, the operator may select a registered electric discharge heating condition based on the type of the optical fiber.

However, there is a case that the type of the target optical fiber is unknown. Optical fibers are very thin, having a diameter of about 125 μm and a core diameter of 10 μm or less. Thus, it is difficult to identify the type of an optical fiber with the naked eye. Usually, the type of the target optical fiber may be automatically determined by the fusion splicer.

In polarization-maintaining optical fibers, a method for measuring lateral imaging graphics by rotating the target optical fiber and determining the type from measuring light transmittance with respect to rotation angle, has been proposed (refer to JP Laid-open No. 2004-341452A (Patent Citation 1)). In polarization-maintaining optical fibers, since non-axisymmetric stress is given to the core, the fact that luminance characteristics of the transmission images depend on the incident direction of the light, can be utilized. For this reason, the proposed method in Patent Citation 1 may be applied only to polarization-maintaining optical fibers.

In a typical optical fiber, a method for determining the type by comparing a luminance distribution waveform acquired from lateral imaging graphics of the target optical fiber with a reference waveform, is proposed (refer to JP Patent No. 4367597 (Patent Citation 2)). As the reference waveform, a luminance distribution waveform preliminarily measured from a reference optical fiber, is stored in the built-in memory of the fusion splicer.

However, optical fibers are non-circular and thus, have eccentricity. Therefore, the luminance distribution waveform of an optical fiber may vary with measurement direction. For the reference waveform stored in the fusion splicer, usually, the luminance distribution measured from one direction may be used. Also, for the target optical fiber, the luminance distribution may be measured from one direction. Since the luminance distribution of the lateral transmission light may be different depending on the measurement direction, there is a possibility of failure in the determination.

Additionally, when the target optical fiber has not yet been registered in the memory of the fusion splicer, there is a problem that the determination can not be carried out. Alternatively, there is a possibility that the target optical fiber is erroneously determined to be an optical fiber having similar luminance distribution.

SUMMARY OF THE INVENTION

In the light of the aforementioned problem, an object of the present invention is to provide a fusion splicer and a method for determining an optical fiber type, capable of improving the accuracy of determination of the optical fiber type.

A first aspect of the present invention provides a fusion splicer including an imaging unit configured to take a lateral transmission image by illuminating a target optical fiber from a lateral direction of the target optical fiber; a determination module configured to create a target luminance distribution in a direction perpendicular to an optical axis of the target optical fiber using the lateral transmission image so as to determine a type of the target optical fiber, by comparing the target luminance distribution with preliminarily registered data of a reference luminance distribution of a reference optical fiber; and a registration module configured to create a message when the target luminance distribution is determined to be outside a tolerance of the reference luminance distribution and to display the message to an operator so that the operator can decide whether or not to register the target luminance distribution of the target optical fiber as a new reference luminance distribution.

A second aspect of the present invention provides a fusion splicer including an imaging unit configured to take a lateral transmission image by illuminating a target optical fiber from a lateral direction perpendicular to an optical axis of the target optical fiber; and a determination module configured to create a target luminance distribution in a direction perpendicular to the optical axis using the lateral transmission image so as to determine a type of the target optical fiber, by comparing the target luminance distribution with preliminarily registered data of a reference luminance distribution of a reference optical fiber; wherein the reference luminance distribution is a luminance distribution created by averaging a plurality of luminance distributions which are created using a plurality of lateral transmission images of the reference optical fiber, the lateral transmission images of the reference optical fiber being taken by the imaging unit by rotating the reference optical fiber.

A third aspect of the present invention provides a method for determining an optical fiber type, including taking a lateral transmission image by illuminating a target optical fiber from a lateral direction perpendicular to an optical axis of the target optical fiber; creating a target luminance distribution in a direction perpendicular to the optical axis using the lateral transmission image and determining a type of the target optical fiber by comparing the lateral transmission image with preliminarily registered data of a reference luminance distribution of a reference optical fiber; and creating a message when the target luminance distribution is determined to be outside a tolerance of the reference luminance distribution and to display the message to an operator so that the operator can decide whether or not to register the target luminance distribution of the target optical fiber as a new reference luminance distribution.

A fourth aspect of the present invention provides a method for determining an optical fiber type, including taking a lateral transmission image by illuminating a target optical fiber from a lateral direction perpendicular to an optical axis of the target optical fiber; and creating a target luminance distribution in a direction perpendicular to the optical axis using the lateral transmission image and determining a type of the target optical fiber by comparing the target luminance distribution with preliminarily registered data of a reference luminance distribution of a reference optical fiber; wherein the reference luminance distribution is a luminance distribution created by averaging a plurality of luminance distributions which are created using a plurality of lateral transmission images of the reference optical fiber, the lateral transmission images of the reference optical fiber being taken by rotating the reference optical fiber.

DETAILED DESCRIPTION OF THE EMBODIMENT OF THE INVENTION

Various embodiments of the present invention will be described with reference to the accompanying drawings. In the following description of the drawings, same or similar parts are given same or similar reference numerals. However, it is noted that the drawings are schematic and that the relationship between thickness and planar dimensions, the proportion of thicknesses of layers, and the like are different from real ones. Accordingly, specific thicknesses and dimensions should be determined with reference to the following description. It is certain that some portions have different dimensional relations and proportions between the drawings.

Also, the following embodiments show devices and methods to embody the technical idea of the invention by way of example. The technical ideas of the invention do not limit the materials, shapes, structures, arrangements, and the like of the constituent components to those described below. The technical idea of the invention can be variously changed within the scope of the claims.

Figure 1:
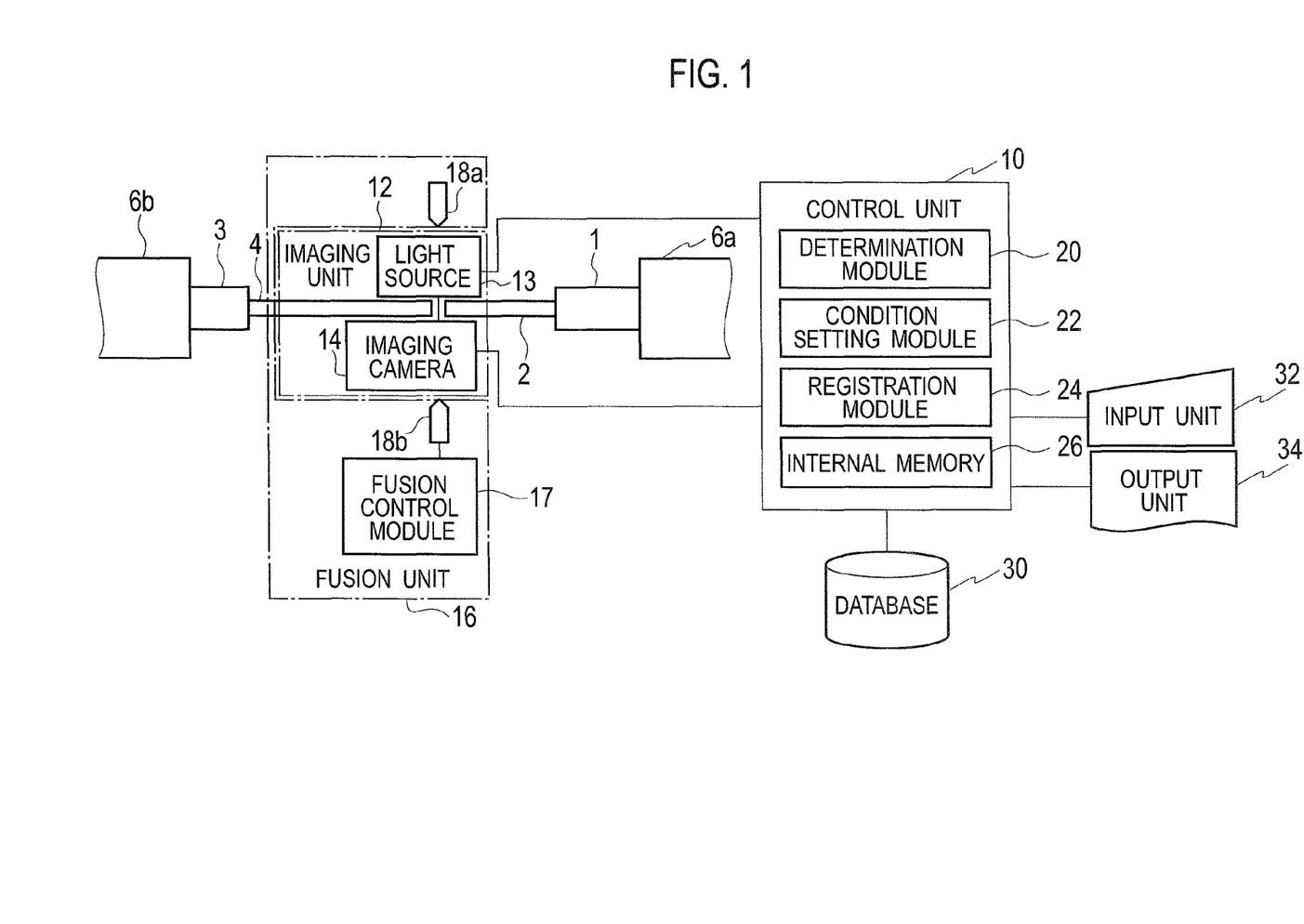
FIG. 1 is a schematic view illustrating an example of a fusion splicer according to an embodiment of the present invention.

A fusion splicer of optical fibers according to an embodiment of the present invention includes optical fiber core wires 1 and 3, holding mechanisms 6a and 6b, a control unit 10, an imaging unit 12, a fusion unit 16, a database 30, an input unit 32, and an output unit 34, as illustrated in FIG. 1. The control unit 10 includes a determination module 20, a condition setting module 22, a registration module 24, and an internal memory 26. The imaging unit 12 includes a light source 13 and an imaging camera 14. The fusion unit 16 includes a fusion control module 17 and discharging electrodes 18a, 18b.

In the optical fiber core wires 1, 3, each of optical fibers 2, 4 is exposed by removing the outer coating at one end. The optical fiber core wires 1, 3 are held by the holding mechanisms 6a and 6b respectively, so as to align the optical axes of the optical fibers 2, 4 such that the exposed ends face each other.

The light source 13 and the imaging camera 14 of the imaging unit 12 are arranged so as to face each other across the opposed end faces of the optical fibers 2, 4 in a direction lateral to the optical fibers 2, 4; for example, in a direction perpendicular to the optical axes. The light source 13 illuminates the optical fibers 2, 4 from a direction lateral to the ends of the optical fibers 2, 4. The imaging camera 14 takes lateral transmission images of the optical fibers 2, 4. In addition, the light source 13 and the imaging camera 14 may be arranged not only in a direction perpendicular to the axes of the optical fibers 2, 4 but also in an oblique direction. Two imaging units 12 may be arranged in directions perpendicular to each other, in a cross-section cut vertically to the optical axes of the optical fibers 2, 4. Hereinafter, description will be given using the optical fiber 2 as a target optical fiber for type determination.

The discharging electrodes 18a, 18b of the fusion unit 16 are arranged so as to face each other across the opposed ends of the optical fibers 2, 4, in a direction perpendicular to the optical axes of the optical fibers 2, 4. The fusion control module 17 controls discharge of the discharging electrodes 18a, 18b in order to fuse the optical fibers 2, 4 placed opposite each other.

The determination module 20 of the control unit 10 creates a luminance distribution in a direction perpendicular to the optical axis of the optical fiber 2, using the lateral transmission image of the optical fiber 2 taken by the imaging unit 12. The created luminance distribution is compared with preliminarily registered data of a reference luminance distribution of a reference optical fiber, and the type of the optical fiber 2 is determined. For example, when the luminance distribution of the optical fiber 2 is within a tolerance of the reference luminance distribution, the optical fiber 2 is determined to be the same type as the reference optical fiber.

The reference luminance distribution is a luminance distribution created by averaging a plurality of luminance distributions created from a plurality of lateral transmission images which are preliminarily taken by rotating the reference optical fiber. The created reference luminance distribution is stored in the database 30. The reference luminance distribution may be created by the fusion splicer illustrated in FIG. 1 or may be created by another apparatus in which a luminance distribution can be measured.

Figure 2:
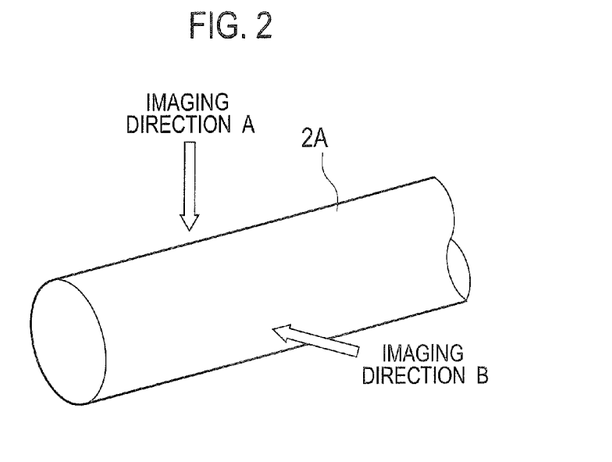
FIG. 2 is a schematic view explaining the imaging direction dependence of a luminance distribution of the optical fiber.
Figure 3:
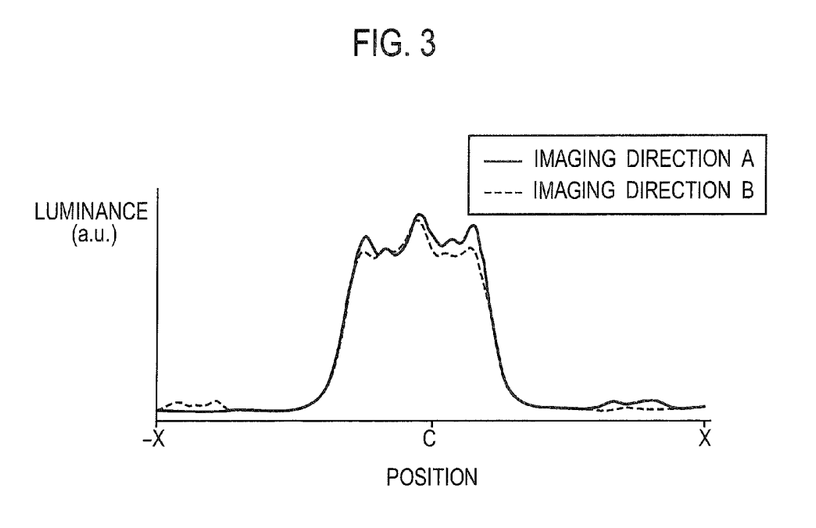
FIG. 3 is a view illustrating an example of the luminance distributions in the imaging directions illustrated in FIG. 2.
Figure 4:
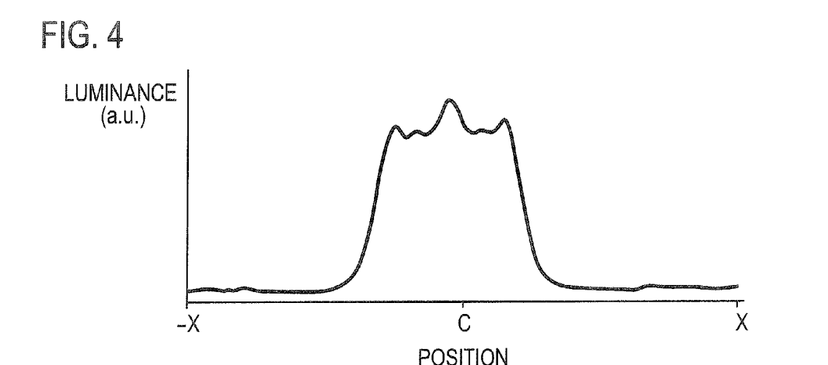
FIG. 4 is a view illustrating an example of a compensated luminance distribution acquired by the fusion splicer according to the embodiment of the present invention.

For example, as illustrated in FIG. 2, the imaging unit 12 takes lateral transmission images of a reference optical fiber 2A from imaging directions A and B. As illustrated in FIG. 3, variation occurs between the luminance distributions created by the determination module 20 from the lateral transmission images in the imaging directions A, B. This variation is caused by eccentricities of the core and clad in the reference optical fiber 2A. Consequently, by rotating the reference optical fiber 2A, plural lateral transmission images of the reference optical fiber 2A are taken from plural imaging directions by the imaging unit 12. Compensations are made for the core and clad eccentricities by averaging the luminance values of the luminance distributions (calculated by the determination module 20 using the lateral transmission images) and thus, as illustrated in FIG. 4, a reference luminance distribution in which the eccentricities are compensated, may be provided.

Based on the determined type of the optical fiber 2, the condition setting module 22 reads out the corresponding fusion conditions which are preliminarily stored in the database 30 and transmits the fusion conditions to the fusion control module 17. For the fusion conditions parameters, the distance between the discharging electrodes 18a, 18b, the discharge power, the discharge duration, and the like, may be set.

When the determination module 20 determines that the characteristics of the compensated luminance distribution is not within the required tolerance of any of the reference distributions stored in the database 30, the registration module 24 creates a message asking the operator to confirm whether or not the luminance distribution of the target optical fiber should be registered as a new reference luminance distribution. The message is displayed on the output unit 34, and if the operator chooses to register the optical fiber 2 by operation of the input unit 32 according to the displayed message, the registration module 24 instructs the imaging unit 12 to take a plurality of new lateral transmission images by rotating the optical fiber 2. The plurality of luminance distributions which are created from the new lateral transmission images by the determination module 20, are averaged, so as to register a new reference luminance distribution in the database 30.

The internal memory 26 temporarily stores data obtained during processing and calculation thereof in the operation of the control unit 10.

In addition, the control unit 10 may be a part of a central processing unit (CPU) in a general purpose computer system. The determination module 20, the condition setting module 22, and the registration module 24 may be discrete hardware or may be provided by virtually equivalent functions achieved by software, using the CPU of the general purpose computer system.

The database 30 stores reference luminance distribution data of a plurality of known types of reference optical fibers including the fusion conditions for each of the reference optical fibers. Reference optical fibers such as a single mode (SM) optical fiber, a dispersion shift (DSF) optical fiber, a proportional dispersion shift (NZ-DSF, hereinafter referred to as NZ) optical fiber, a multi mode (MM) optical fiber, and the like, may be used.

Examples of the input unit 32 include devices such as a keyboard, a mouth, or the like. When an input operation is performed on the input unit 32, corresponding key information is transmitted to the control unit 10. The output unit 34 consists of a screen monitor such as a liquid crystal display (LCD), a light emitting diode (LED) panel, an electroluminescent (EL) panel, and the like. The output unit 34 displays data such as luminance distribution and optical fiber determination results processed by the control unit 10 or data for the registration procedure of an unregistered optical fiber, and the like.

In the reference luminance distribution used in the fusion splicer according to the embodiment, the lateral transmission images of the reference optical fiber 2A are taken from plural directions, and the variation in the luminance distribution caused by the core and the clad eccentricities is compensated. Therefore, the type of the optical fiber 2 can be determined with high accuracy.

Furthermore, in the fusion splicer according to the embodiment, when the luminance distribution of the target optical fiber 2 is determined to be outside the required tolerance of the reference luminance distribution, the operator can confirm, by the displayed message of the output unit 34, that the type of the optical fiber 2 can not be determined. When the operator decides that the optical fiber 2 of a different type has been incorrectly installed by mistake, the optical fiber 2 may be exchanged for a new optical fiber. Also, when the operator determines that the optical fiber 2 is not yet registered and registration is necessary, it is possible to register the fiber as a new entry in the database 30 by creating a luminance distribution for the new reference optical fiber.

Figure 5:
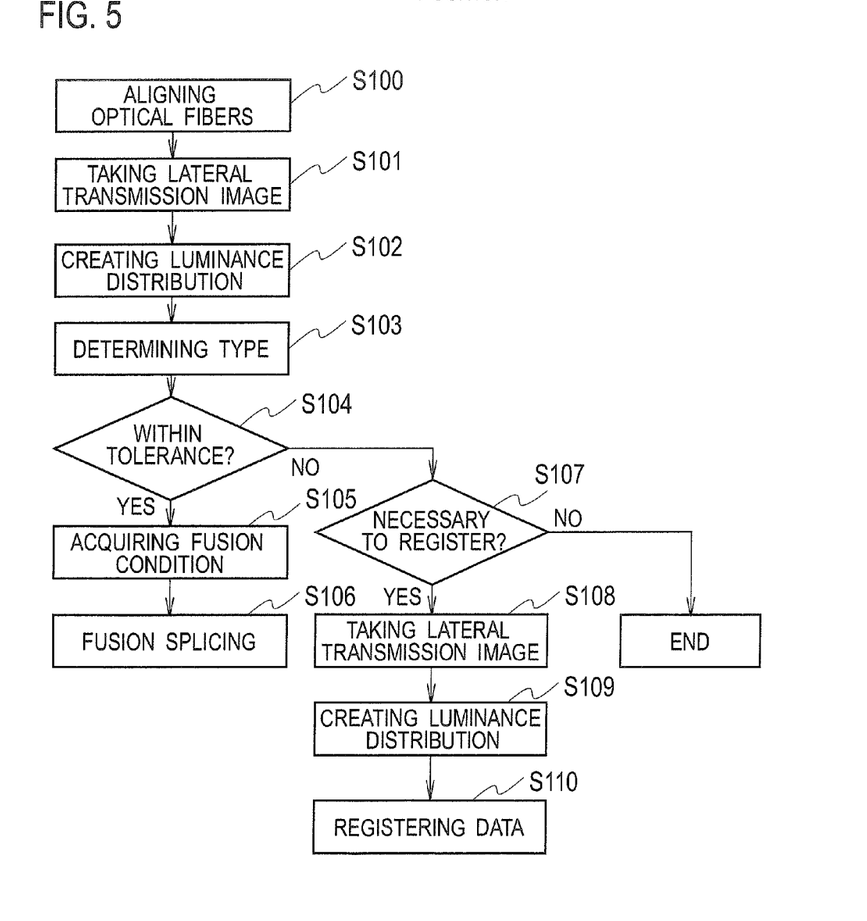
FIG. 5 is a flowchart illustrating an example of a fusion splicing method for the optical fibers according to the embodiment of the present invention.

The optical fiber type determination method and the fusion splicing method according to the embodiment of the present invention will be described with reference to the flowchart illustrated in FIG. 5. Hereinafter, description will be given using the optical fiber 2 as a determination target. However, the optical fiber 4 may be processed in parallel.

In Step S100, the coating on one end of each of the optical fiber core wires 1, 3 is removed so as to expose the optical fibers 2, 4. As illustrated in FIG. 1, the optical fiber core wires 1, 3 are placed in the holding mechanisms 6a and 6b of the fusion splicer so that the end faces of the optical fibers 2, 4 face each other.

In Step S101, the imaging unit 12 takes a lateral transmission image of the optical fiber 2 in a direction perpendicular to the optical axis of the optical fiber 2. The lateral transmission image is transmitted to the control unit 10.

In Step S102, the determination module 20 in the control unit 10 creates a luminance distribution in a direction perpendicular to the optical axis of the optical fiber 2 using the input lateral transmission image. In Step S103, the determination module 20 compares the created luminance distribution with the luminance distribution data of the reference optical fiber preliminarily registered in the database 30. In Step S104, when the luminance distribution of the optical fiber 2 is within the required tolerance of the reference luminance distribution, the optical fiber 2 is determined to be the same type as the reference optical fiber. Then, the process proceeds to Step S105.

In Step S105, based on the determined type of the optical fiber 2 and the type of the optical fiber 4, the condition setting module 22 reads out the fusion conditions which are preliminarily stored in the database 30. The fusion conditions are transmitted to the fusion control module 17. Then, In Step S106, the fusion unit 16 carries out a fusion splicing process for the optical fibers 2, 4.

In Step S104, when the luminance distribution of the optical fiber 2 is determined to be outside of the required tolerance of all of the reference luminance distributions stored in the database 30, a message (for example, "unregistered optical fiber") is displayed on the output unit 34. Then, the process proceeds to Step S107.

In Step S107, the operator decides whether it is necessary to create a new registration. When registration is determined to be necessary, processing continues to Step S108, and the imaging unit 12 takes a plurality of lateral transmission images by rotating the optical fiber 2.

In Step S109, the determination module 20 creates a plurality of luminance distributions using the respective lateral transmission images. The new reference luminance distribution is created by averaging the luminance distributions.

In Step S110, the new reference luminance distribution created by the determination module 20 is registered in the database 30 by operation of the input unit 32.

In Step S107, when the operator determines that registration is not necessary because the optical fiber 2 has been incorrectly installed by mistake, the processing is terminated, and the optical fiber 2 is exchanged for a new optical fiber.

In addition, in the above explanation, the lateral transmission image for the optical fiber 2 is taken from just one direction during the type determination of the optical fiber 2. However, the type determination may be implemented by using lateral transmission images for the optical fiber 2 taken from plural directions. For example, by rotating the optical fiber 2, the imaging unit 12 may take a plurality of lateral transmission images. The determination module 20 creates a plurality of luminance distributions from the respective lateral transmission images and creates the target luminance distribution of the optical fiber 2 by averaging the luminance distributions. Thus, in the target luminance distribution, the variation caused by the core and clad eccentricities in the optical fiber 2 is compensated, in the same way as the reference luminance distribution. If such plural lateral transmission images are carried out, the type of the optical fiber 2 can be determined with higher accuracy.

Figure 6:
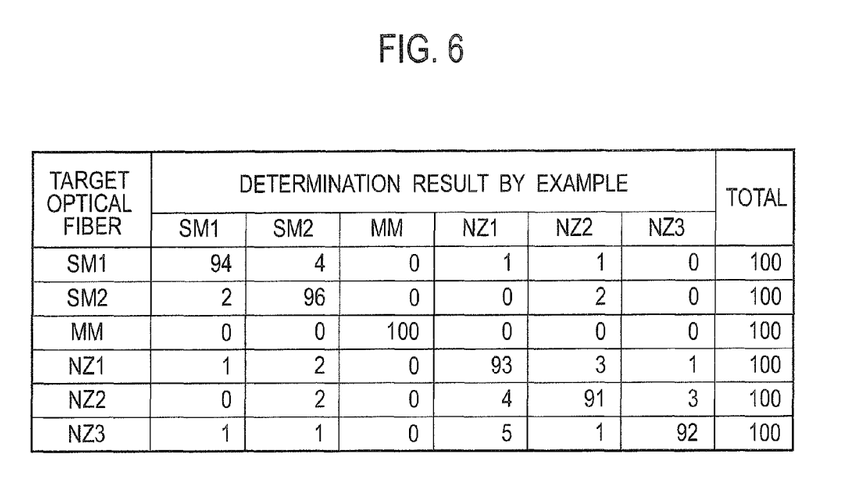
FIG. 6 is a table illustrating an example of a determination result of the optical fiber according to the embodiment of the present invention.

As a practical example according to the type determination method of the optical fiber according to the embodiment, FIG. 6 illustrates the determination result for a variety of optical fiber types. For each optical fiber determination target (the target optical fiber), the lateral transmission image is taken from one direction without any rotation. "SM1" and "SM2" in the table of FIG. 6 are SM optical fibers each having a different specification. Similarly, "NZ1", "NZ2", and "NZ3" are NZ optical fibers each having a different specification. Also, FIG. 7 illustrates a comparative example for the determination result of the same optical fibers illustrated in FIG. 6, in the case where the reference luminance distribution has also been created from only one direction (i.e. without rotating either the reference optical fiber or the target optical fiber).

As illustrated in the table of FIG. 6, in the practical example, rates of correct determination for the SM and NZ optical fibers are in a range of 91% to 94%, and thus the determination is implemented with high accuracy. Also, for the MM optical fiber, the rate of correct determination is 100%, and thus the determination is implemented without failure.

Figure 7:
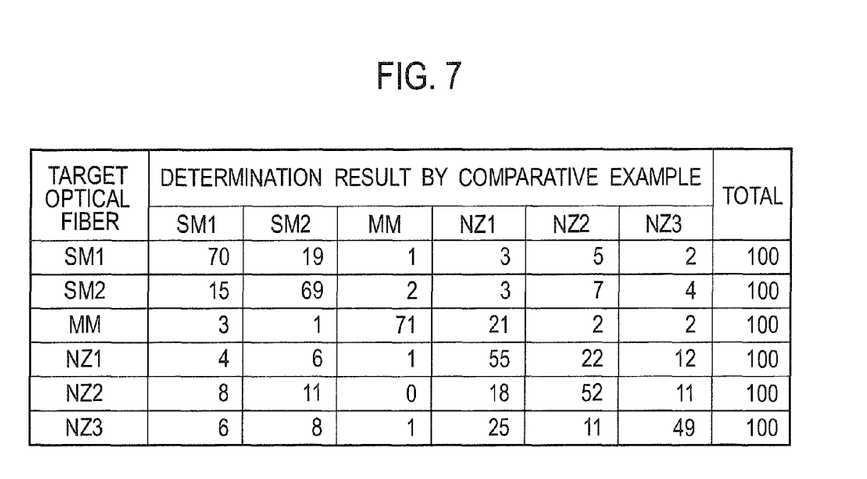
FIG. 7 is a table illustrating an example of a determination result of the optical fiber of a comparative example.

On the contrary, in the comparison example, rates of correct determination are in a range of 69% to 70% for the SM optical fibers and in a range of 49% to 55% for the NZ optical fibers, as illustrated in the table of FIG. 7. Thus, accuracy is decreased. Also, for the MM optical fiber, the rate of correct determination is 71% and thus, it is understood that erroneous determination often occurs.

Thus, in the type determination method of the optical fiber according to the embodiment, the variation in the reference luminance distribution of the reference optical fiber caused by the core and clad eccentricities is compensated for by using lateral transmission images taken from plural directions. Thus, the type of the optical fiber can be determined with high accuracy.

Furthermore, in the embodiment, when the target optical fiber is determined to be unregistered, the luminance distribution of the target optical fiber created by averaging the luminance distributions of plural directions, can be registered as a new reference optical fiber in the database 30 if the operator determines that registration is necessary.

Figure 8:
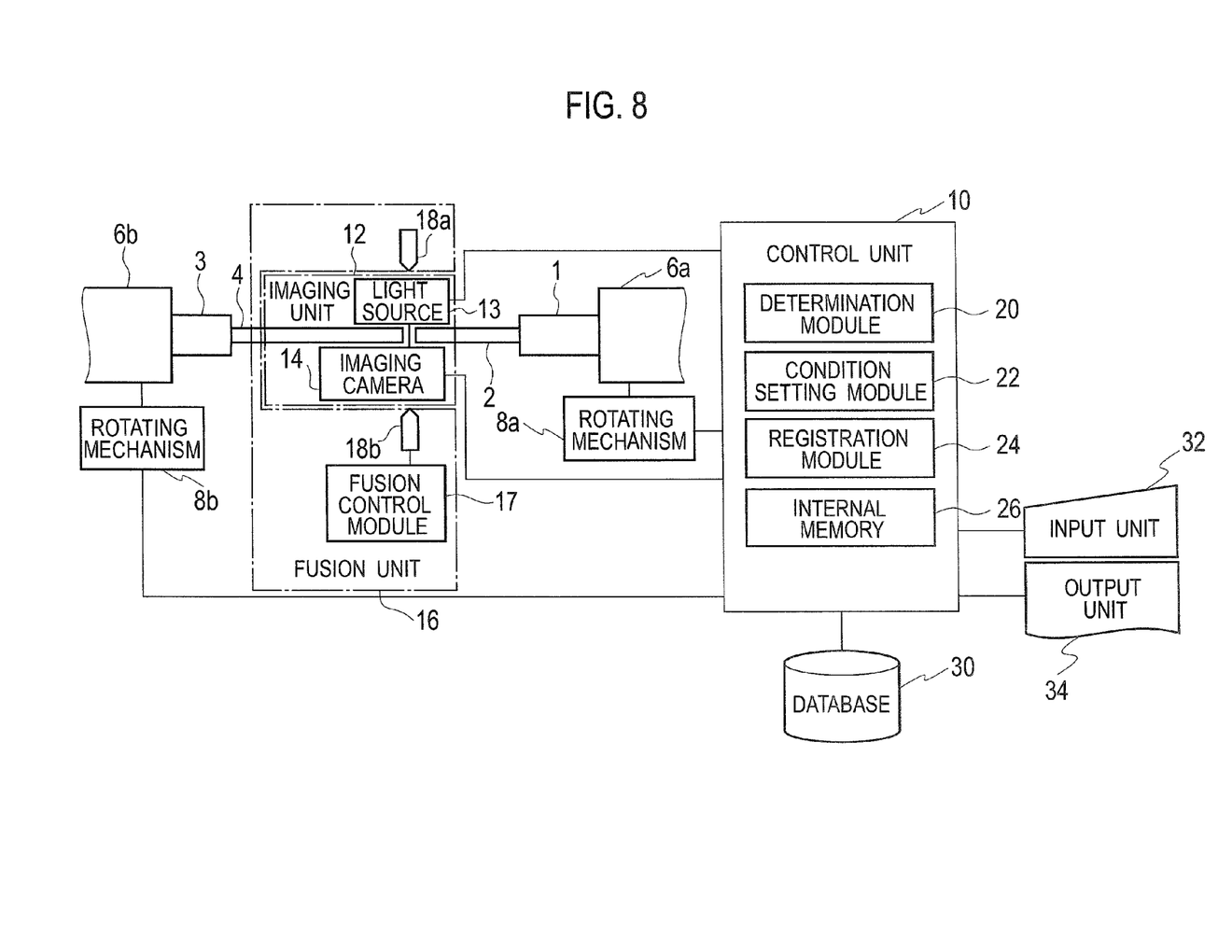
FIG. 8 is a schematic view illustrating another example of the fusion splicer according to the embodiment of the present invention.

In the fusion splicer used in the above explanations, the optical fibers 2, 4 are manually rotated directly by the operator. However, as illustrated in FIG. 8, the optical fibers 2, 4 may be rotated by rotating mechanisms 8a, 8b provided in the holding mechanisms 6a, 6b, respectively. For example, it is possible to take the lateral transmission images by automatically rotating the optical fibers 2, 4 using the rotating mechanisms 8a, 8b. Alternatively, the optical fibers 2, 4 may also be rotated to any rotation angle by operation of the input unit 32 by the operator. Therefore, for the reference optical fiber and the target optical fiber, it is possible to decrease the time required to take lateral transmission images from plural directions.

OTHER EMBODIMENTS

The present invention has been described as mentioned above. However the descriptions and drawings that constitute a portion of this disclosure should not be perceived as limiting this invention. Various alternative embodiments and operational techniques will become clear to persons skilled in the art from this disclosure. Accordingly, the technical scope of the present invention is determined only by the features of the invention according to proper claims.

What is claimed is:

1. A fusion splicer comprising:
   an imaging unit configured to take a lateral transmission image by illuminating a target optical fiber from a lateral direction of the target optical fiber;
   a determination module configured to create a target luminance distribution in a direction perpendicular to an optical axis of the target optical fiber using the lateral transmission image so as to determine a type of the target optical fiber, by comparing the target luminance distribution with preliminarily registered data of a reference luminance distribution of a reference optical fiber; and
   a registration module configured to create a message when the target luminance distribution is determined to be outside a tolerance of the reference luminance distribution and to display the message to an operator so that the operator can decide whether or not to register the target luminance distribution of the target optical fiber as a new reference luminance distribution,
   wherein, when the registration of the target optical fiber is selected in accordance with the message, a plurality of new lateral transmission images are taken by rotating the target optical fiber, so as to register a new reference luminance distribution created by averaging a plurality of luminance distributions which are created using the new lateral transmission images.

2. A fusion splicer comprising:
   an imaging unit configured to take a lateral transmission image by illuminating a target optical fiber from a lateral direction perpendicular to an optical axis of the target optical fiber;
   a determination module configured to create a target luminance distribution in a direction perpendicular to the optical axis using the lateral transmission image so as to determine a type of the target optical fiber, by comparing the target luminance distribution with preliminarily registered data of a reference luminance distribution of a reference optical fiber; and
   a registration module configured to create a message when the target luminance distribution is determined to be outside a tolerance of the reference luminance distribution and to display the message to an operator so that the operator can decide whether or not to register the target luminance distribution of the target optical fiber as a new reference luminance distribution,
   wherein the reference luminance distribution is a luminance distribution created by averaging a plurality of luminance distributions which are created using a plurality of lateral transmission images of the reference optical fiber, the lateral transmission images of the reference optical fiber being taken by the imaging unit by rotating the reference optical fiber, and
   wherein, when the registration of the target optical fiber is selected in accordance with the message, a plurality of new lateral transmission images are taken by rotating the target optical fiber, so as to register a new reference luminance distribution created by averaging a plurality of luminance distributions which are created using the new lateral transmission images.

3. The fusion splicer of claim 1, wherein the target luminance distribution is created by averaging a plurality of luminance distributions created using a plurality of lateral transmission images which are taken by rotating the target optical fiber.

4. The fusion splicer of claim 1, further including a rotating mechanism configured to rotate the target optical fiber around the optical axis.

5. A method for determining an optical fiber type, comprising:
taking a lateral transmission image by illuminating a target optical fiber from a lateral direction perpendicular to an optical axis of the target optical fiber;
creating a target luminance distribution in a direction perpendicular to the optical axis using the lateral transmission image and determining a type of the target optical fiber by comparing the lateral transmission image with preliminarily registered data of a reference luminance distribution of a reference optical fiber; and
creating a message when the target luminance distribution is determined to be outside a tolerance of the reference luminance distribution and to display the message to an operator so that the operator can decide whether or not to register the target luminance distribution of the target optical fiber as a new reference luminance distribution,
wherein, when the registration of the target optical fiber is selected in accordance with the message, a plurality of new lateral transmission images are taken by rotating the target optical fiber, so as to register a new reference luminance distribution created by averaging a plurality of luminance distributions which are created using the new lateral transmission image.

6. A method for determining an optical fiber type, comprising:
taking a lateral transmission image by illuminating a target optical fiber from a lateral direction perpendicular to an optical axis of the target optical fiber; and
creating a target luminance distribution in a direction perpendicular to the optical axis using the lateral transmission image and determining a type of the target optical fiber by comparing the target luminance distribution with preliminarily registered data of a reference luminance distribution of a reference optical fiber;
wherein the reference luminance distribution is a luminance distribution created by averaging a plurality of luminance distributions which are created using a plurality of lateral transmission images of the reference optical fiber, the lateral transmission images of the reference optical fiber being taken by rotating the reference optical fiber.

7. The method of claim 6, further comprising:
creating a message when the target luminance distribution is determined to be outside a tolerance of the reference luminance distribution and to display the message to an operator so that the operator can decide whether or not to register the target optical fiber as a new reference luminance distribution.

8. The method of claim 7, wherein, when the registration of the target optical fiber is selected in accordance with the message, a plurality of new lateral transmission images are taken by rotating the target optical fiber, so as to register a new reference luminance distribution created by averaging a plurality of luminance distributions which are created using the new lateral transmission images.

9. The method of claim 5, wherein the target luminance distribution is created by averaging a plurality of luminance distributions created using a plurality of lateral transmission images which are taken by rotating the target optical fiber.

10. The fusion splicer of claim 2, wherein the target luminance distribution is created by averaging a plurality of luminance distributions created using a plurality of lateral transmission images which are taken by rotating the target optical fiber.

11. The fusion splicer of claim 2, further including a rotating mechanism configured to rotate the target optical fiber around the optical axis.

12. The fusion splicer of claim 3, further including a rotating mechanism configured to rotate the target optical fiber around the optical axis.

13. The method of claim 6, wherein the target luminance distribution is created by averaging a plurality of luminance distributions created using a plurality of lateral transmission images which are taken by rotating the target optical fiber.

14. The method of claim 7, wherein the target luminance distribution is created by averaging a plurality of luminance distributions created using a plurality of lateral transmission images which are taken by rotating the target optical fiber.

15. The method of claim 8, wherein the target luminance distribution is created by averaging a plurality of luminance distributions created using a plurality of lateral transmission images which are taken by rotating the target optical fiber.

* * * * *